Nov. 4, 1952　　G. J. WOLFORD ET AL　　2,616,744
VACUUM SANDER
Filed April 7, 1950　　2 SHEETS—SHEET 1
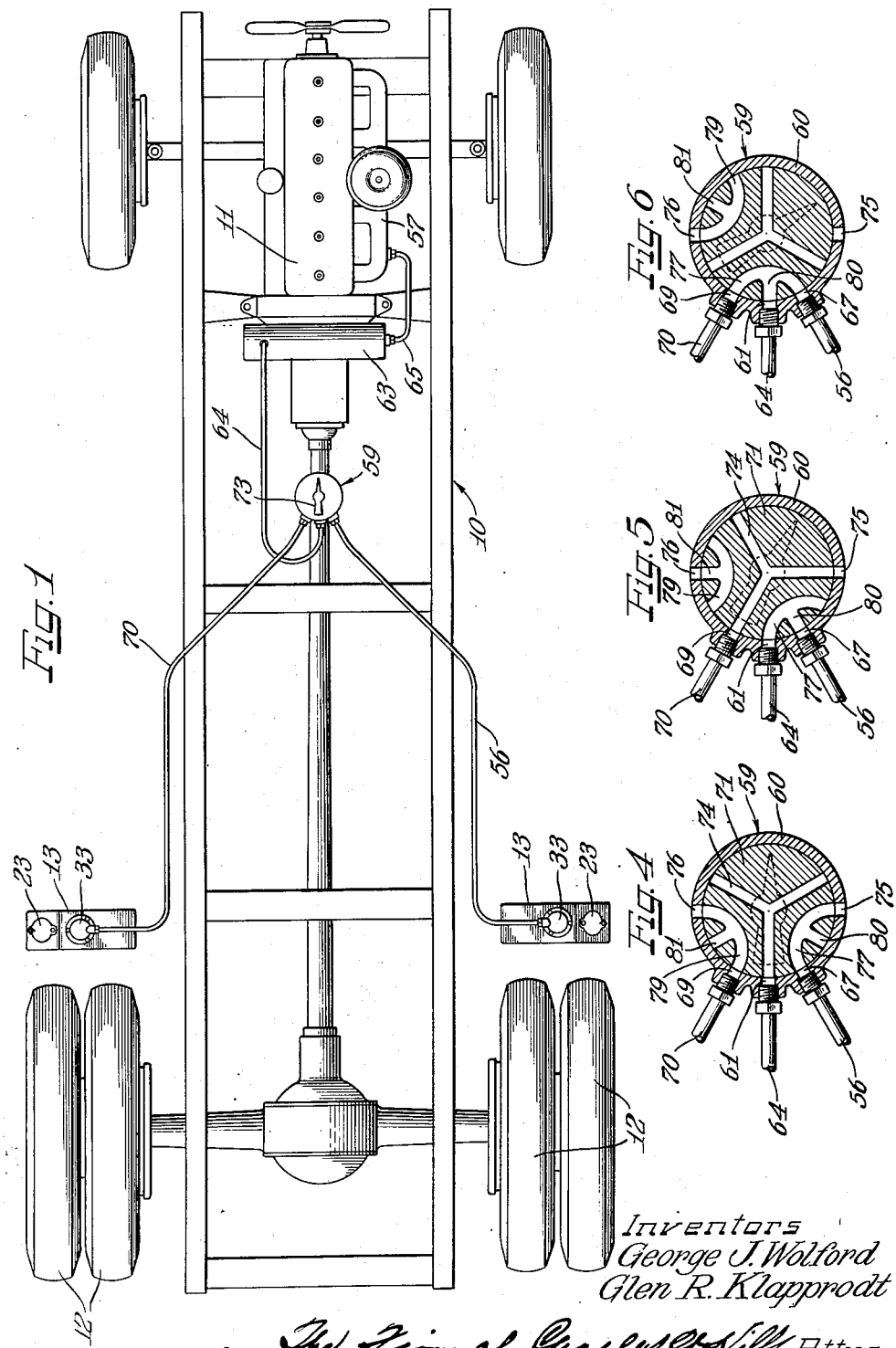
Inventors
George J. Wolford
Glen R. Klapprodt
by The Firm of Charles W. Hills Attys

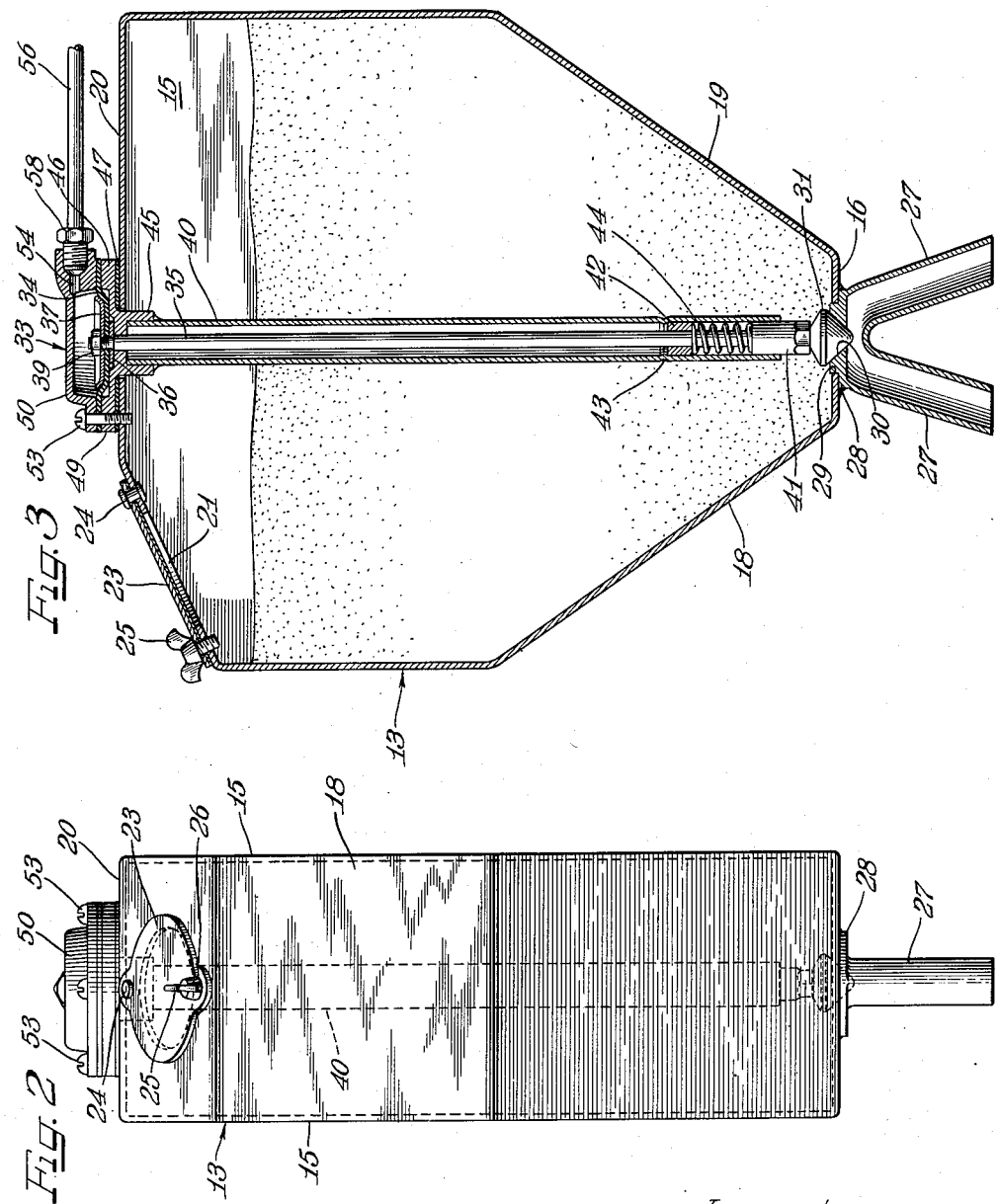
Nov. 4, 1952     G. J. WOLFORD ET AL     2,616,744
VACUUM SANDER
Filed April 7, 1950     2 SHEETS—SHEET 2
Inventors
George J. Wolford
Glen R. Klapprodt Patented Nov. 4, 1952

2,616,744

UNITED STATES PATENT OFFICE 2,616,744

VACUUM SANDER

George J. Wolford and Glen R. Klapprodt, Dixon, Ill.

Application April 7, 1950, Serial No. 154,662

4 Claims. (Cl. 294—24)

This invention relates to sanders of the type adapted to sand in front of the wheels of rubber-tired motor vehicles such as trucks or busses.

A principal object of our invention is to provide a simplified form of improved sander for motor vehicles wherein the power for effecting the sanding operation is obtained from the intake manifold of the internal combustion engine which propels the vehicle.

Another object of our invention is to provide a novel and improved form of sander, selectively operable to sand in front of the wheels of a vehicle on either one or both sides thereof.

A still further object of our invention is to provide a novel form of sander including a poppet valve controlling the flow of sand through each sand pipe and separate vacuum operated diaphragms operating said valves.

A further and more detailed object of our invention is to provide a new and improved sand box having a sand pipe extending from the bottom thereof opening from said box and the opening thereof forming a valve seat, and also having an aligned fitting mounted at the top of the box having a protecting tube depending therefrom and forming a guide and protecting means for the valve and the operating means therefor.

These and other objects of our invention will appear from time to time as the following specification proceeds with reference to the accompanying drawings wherein:

Figure 1 is a plan view of the chassis of a motor vehicle showing a sanding device constructed in accordance with our invention incorporated therein and connected with the intake manifold of the propelling engine for the vehicle;

Figure 2 is an enlarged end view of one of the sand boxes of our invention;

Figure 3 is a transverse sectional view taken through the sand box shown in Figure 2 and showing certain details of the valve means controlling the supply of sand to the vehicle wheels;

Figure 4 is a horizontal sectional view taken through the manually operable control valve for controlling the sanding operation, showing the valve in an "off" position;

Figure 5 is a view somewhat similar to Figure 4 but showing the valve in position to sand the right-hand vehicle wheels only; and Figure 6 is a sectional view somewhat similar to Figures 4 and 5 but showing the valve in position to sand both wheels of the vehicle.

Referring now in particular to the drawings, a chassis 10 of a motor vehicle, which may be a truck or bus, is shown as having an internal combustion engine 11 for propelling the vehicle and as having dual rubber-tired rear drive wheels 12—12 suitably driven by said engine for propelling the vehicle.

A sand box 13 is mounted in front of each drive wheel 12 in a suitable manner, not herein shown or described since the mounting thereof forms no part of my present invention. Each sand box 13 is herein shown as being relatively wide and short in proportion to the length of the vehicle, with parallel spaced end walls 15—15, a short bottom wall 16, and hopper-like side walls 18 and 19 extending upwardly therefrom and diverging as they extend upwardly for a portion of the height thereof and then extending vertically to form a hopper-like box and assure full use of the sand therein. The sand box 13 likewise has a top wall 20 extending horizontally for a greater portion of the width of the box and having a downwardly inclined end portion having an opening 21 therein to enable the box to be filled with sand. The opening 21 is closed by a pivoted cover 23 pivoted to the inclined portion of the top wall 20 on a rivet 24 and locked in a closed position by means of a wing bolt 25 threaded in the sloping portion of said top and engaging an open-ended locking slot 26 of said cover to lock said cover in a closed position (Figure 2).

Two diverging integrally formed sand pipes 27—27 extend downwardly from the bottom 16 to supply sand to the dual wheels 12—12. As herein shown, the sand pipes 27—27 are formed integrally with and extend downwardly from a flanged fitting 28 fitting within an apertured portion 29 of the bottom 16 and suitably secured to said bottom, as by welding. The flanged fitting 28 is shown as having an inverted frusto-conical opening 30 formed therein with the largest part thereof opening into the sand box 13 and forming a valve seat for a conical valve element 31 of the poppet type.

The valve element 31 is moved to an open position by a suction or vacuum motor formed by a vacuum chamber 33 mounted on the top 20 of the sand box and having a diaphragm 34 extending thereacross. The diaphragm is connected with the valve element 31 through a valve rod 35 threaded at its upper end and extending through said diaphragm and upper and lower diaphragm plates 36 and 37. The lower diaphragm plate 36 abuts a shouldered portion of said rod, and said plates and diaphragm are secured to said rod as by a nut 39 threaded on the upper end thereof and abutting the top diaphragm plate. The rod 35 is protected from sand by means of a tube 40 spaced from and encircling said rod. The lower end of said rod is connected to the valve element 31 by means of a cylindrical guide member 41 slidably engaging the lower end of said tube 40 and having the valve element 31 secured to its lower end and depending therefrom. The rod 35 also extends through a cylindrical guide member 42 mounted within the tube 40 and abutting at its upper end a crimped portion 43 thereof. A compression spring 44 encircles the lower end of the rod 35 and is interposed between the bottom of the guide member 41 and the top of the cylindrical guide member 41 to urge the valve element 31 into engagement with its seat 30.

The upper end of the tube 40 is mounted within and secured to a depending annular portion 45 of a flanged fitting 46 abutting and secured to the top 20 of the sand box and shown as having a packing member 47 interposed between the bottom of said fitting and the top of said sand box. The fitting 46 has an upwardly extending annular portion 49 forming an annular engaging surface engaged by the lower edge of the diaphragm 34. A cap 50 opening toward the ground and having an annular flanged portion like the annular portion 49 abuts the top portion of the diaphragm 34 and is clamped thereagainst by means of machine screws 53—53 securing the fitting 46 to the top of the sand box 20. The cap 50 is of an inverted cup-like shape and the space between the top of said cap and the diaphragm 34 forms a vacuum chamber for extending the diaphragm 34 and opening the valve element 31 upon the creation of suction therein. The passageway 54 leads from the suction chamber 33 and has a fitting 55 threaded therein from which extends a suction line 56.

The suction line 56 is selectively connected to the intake manifold 57 of the internal combustion engine 11 or to atmosphere by means of a three-way valve 59. The valve 59 may be of any well known form, but is herein shown as being a rotary plug type of valve and includes generally a valve casing 60 having a suction port 61 therein, connected to a suction tank 63 by means of a suction line 64.

The tank serves as an accumulator to take care of variations in vacuum in manifold 57 and to provide a relatively constant vacuum for all running conditions of the engine. A suction line 65 connects the tank 63 with the suction manifold 57. Thus, when the engine is running, a vacuum will be created in the line 65, tank 63, and line 64.

The valve casing 60 likewise has suction or vacuum ports 67 and 69 on opposite sides of the suction port 61 and herein shown as being spaced equal distances therefrom. The port 67 has the suction line 56 connected thereto, to exert suction in the right-hand diaphragm chamber 33 and effect operation of the right-hand sander. The suction port 69 has a suction line 70 connected thereto and serves to create a suction in the suction chamber 33 of the left-hand sander to sand the left vehicle wheels.

The casing 60 of the valve 59 has a valve plug 71 pivotally mounted therein and moved to its various operative positions by means of an operating handle 73. The plug 71 is herein shown as having a Y-shaped passageway 74 formed therein, which serves as a relief passageway to relieve vacuum from either of the chambers 33—33 of the right-hand or left-hand sanders when the valve is positioned to sand one set of wheels only.

As for example, in Figure 5, the passageway 74 is in communication with the port 69 in the casing 60 at one of its branches and another branch of said passageway is in communication with a relief port 75 formed in said casing to allow air at atmospheric pressure to enter the suction line 70 and vacuum chamber 33. In a like manner, when the valve is in an opposite position, to sand the left wheels only, one branch of the passageway 74 is connected with the port 67 while another branch of said passageway is connected with a port 76 formed in the casing 60 to admit air at atmospheric pressure to the right-hand pressure line 56 in the chamber 33.

The valve plug 71 likewise has two arcuate passageways 77 and 79 formed therein and opening to the periphery of said plug at spaced-apart points. Radial passageways 80 and 81 enter the arcuate passageways 77 and 79, respectively, intermediate the extremities thereof.

When the valve plug 71 is in the position shown in Figure 5, the passageway 80 will register with the port 67 connected with the right vacuum line 56 while one extremity of the passageway 77 will register with the port 61 to create a vacuum and a right-hand vacuum chamber 33 and effect operation of the right-hand sander. When the valve is in the position shown in Figure 4, the adjacent extremities of the passageways 77 and 79 will be connected with the ports 67 and 69, while the opposite extremities of said passageways will communicate with the relief passageways 75 and 76 to allow air at atmospheric pressure to enter the chambers 33—33 and thus to assure closing of the valves 31—31.

When the valve plug 71 is in the position shown in Figure 6, the passageway 77 will communicate with the two ports 67 and 69, while the radial passageway 80 will be in communication with the port 61. This will create a vacuum in the two vacuum chambers 33—33 and sand the two sets of dual drive wheels 12—12 of the vehicle. It should here be noted that the passageways 77 and 79 are so located with respect to each other that when the valve handle 73 is turned 120° in an opposite direction from the position shown in Figure 6 the passageway 79 will communicate with the two ports 67 and 69 and the central passageway 81 will communicate with the port 61 to effect sanding of the two sets of dual drive wheels 12—12 of the vehicle.

In operation of the sander, when the engine 11 of the vehicle is in operation the accumulator tank 63 will assure a relatively constant vacuum in the vacuum line 64 for all running conditions of the engine. When it is desired to sand the two sets of rear wheels, the valve handle 73 may be turned to the position shown in Figure 6 or to the opposite position just mentioned. This will create a vacuum in the suction lines 56 and 70 in two vacuum chambers 33—33, extending the diaphragm 34, and lifting the rod 35 and valve element 31 against the compression spring 44, and opening the valve port 30 for the flow of sand through the two sand pipes 27—27, on either side of the vehicle, and supply sand directly in the pathway of the vehicle drive wheels, and thus afford a means for increasing the tractive effort thereof. In a like manner, when it is desired to sand only the right-hand or the left-hand set of dual drive wheels, the valve handle 73 may be turned to position one end of the arcuate passageway 77 in communication with the port 61 to sand a right-hand dual drive wheel or to position one end of the passageway 79 in communication with the port 61 to sand the left-hand dual drive wheels in an obvious manner.

It may further be seen that a simple, novel and rugged sanding device has been provided which is particularly adapted to sand the wheels of road vehicles, and that the device is so constructed and arranged as to assure a tight closing of the sanding valve and a positive opening thereof, to supply sand to the desired vehicle wheels by power derived solely from the intake manifold of the vehicle engine. It may further be seen that the valve parts are protected against sand and moisture and that the operating mechanism therefor is on the outside of the sand box away from the sand therein and readily accessible for inspection or repair. It may still further be seen that the entire valve assembly may be removed by removal of the machine screws 53—53 and the fitting 55 and lifting the assembly out of the sand box.

It should further be noted that the opening 30 from the bottom of the sand box is sufficiently large to accommodate materials other than sand. When using the term "sander," therefore, it is not intended to be limited to a device for the use of sand alone, as the invention is considered broadly as a device for supplying any kind of similar friction material desired to afford traction for the vehicle wheels.

It will be understood that modifications and variations may be effected without departing from the scope of the novel concepts of the present invention.

We claim as our invention:

1. In a sander for internal combustion engine propelled road vehicles, two sand boxes, each being disposed adjacent the traction wheels of the vehicle and each having a fitting secured to the bottom thereof with a sand pipe extending therefrom, said fitting opening into said box and the walls of the opening thereof forming a valve seat, a flanged fitting mounted on the top of each sand box and having an annular wall depending therefrom within said box, a tubular shield depending from said fitting to a position in alignment with said valve seat but spaced vertically therefrom, a rod guided within said tubular shield for reciprocable movement with respect thereto, a poppet valve secured to the lower end of said rod for engagement with said seat, a downwardly opening recessed cap secured to the top of said annular fitting and forming a vacuum chamber, vacuum-operated means movable within said chamber, and a valve rod connecting said vacuum-operated means to said valve to open said valve upon the creation of a vacuum in said chamber, and means selectively operable to create a vacuum in said chamber.

2. In a vacuum-operated sander comprising a sand box adapted to be disposed adjacent a traction wheel of a vehicle, a fitting secured to the bottom of said box and having a sand pipe depending therefrom, said fitting having an apertured portion opening from said sand box to said pipe and the walls thereof forming a frusto-conical valve seat, a suction chamber mounted on the top of said sand box and having an annular wall depending into said sand box, a diaphragm extending across said chamber, a tubular shield depending from said annular wall to a position adjacent but spaced above said valve seat, a rod guided within said shield, diaphragm plates engaging opposite sides of said diaphragm and connecting said rod thereto, a poppet valve secured to the lower end of said rod for engagement with said seat, spring means encircling said rod for engaging said poppet valve with said seat, and said diaphragm moving said valve away from said seat to release sand from said box upon the creation of sufficient vacuum within said vacuum chamber to extend said diaphragm with respect thereto.

3. In a sander for internal combustion engine propelled road vehicles, a sand box adapted to be disposed adjacent each traction wheel of the vehicle, a vacuum chamber mounted on the top of each sand box, a diaphragm extending across and forming a lower wall of said vacuum chamber, a sand pipe secured to the bottom of each sand box and depending therefrom, an annular wall portion forming an opening from said sand box to said pipe, a valve element having a conical engaging surface seated on said wall and closing the opening to said pipe, an operative connection from said valve element to said diaphragm, unseating said valve element upon the creation of sufficient vacuum within said chamber to unseat said valve, a separate vacuum line connected to the vacuum chamber of each sand box, another vacuum line connected from the intake manifold of the vehicle, and a single valve connected with said vacuum lines and manually operable by the operator of the vehicle and selectively operable to connect the intake manifold of the vehicle to create a vacuum in either one or both of said vacuum chambers to effect sanding of the roadway in advance of the wheels of the vehicle on either one or both sides thereof.

4. In a sander for internal combustion engine propelled vehicles, a sand box adapted to be disposed adjacent each traction wheel of the vehicle, a vacuum chamber mounted on top of each sand box, a diaphragm extending across and forming a lower wall of said vacuum chamber, a rod secured to and depending from said diaphragm, a valve element having a conical engaging surface on the lower end of said rod, a sand pipe secured to the bottom of said sand box and depending therefrom, an annular wall portion of said sand pipe opening into said sand box and forming a seat for said valve element, a tubular shield encircling said rod and depending from the top of said sand box and having a slidable guiding engagement with said rod, a spring within said shield urging said valve element into engagement with its seat in said sand pipe, a vacuum line connected to the vacuum chamber of each sand box, another vacuum line connected from the intake manifold of the vehicle, and a single valve connected with said vacuum lines and manually operable by the operator of the vehicle to selectively connect the intake manifold of the vehicle to either one or both of said vacuum chambers, to effect sanding of the roadway in advance of the wheels of the vehicle on either one or both wheels of the vehicle.

GEORGE J. WOLFORD.
GLEN R. KLAPPRODT.

REFERENCES CITED

The following references are of record in the file of this patent:

UNITED STATES PATENTS

| Number | Name | Date |
|---|---|---|
| 417,214 | Austin | Dec. 17, 1889 |
| 2,131,514 | Johnson et al | Sept. 27, 1938 |